United States Patent [19]

Zeiner et al.

[11] Patent Number: 4,590,104

[45] Date of Patent: May 20, 1986

[54] PRODUCTION OF FIBER-REINFORCED MATERIALS

[75] Inventors: Hartmut Zeiner, Plankstadt; Jürgen Fischer, Ludwigshafen; Gerhard Heinz, Weisenheim; Peter Neumann, Wiesloch; Dietmar Nissen; Gerhard Schaefer, both of Heidelberg, all of Fed. Rep. of Germany

[73] Assignee: BASF Aktiengesellschaft, Fed. Rep. of Germany

[21] Appl. No.: 701,535

[22] Filed: Feb. 14, 1985

[30] Foreign Application Priority Data

Feb. 16, 1984 [DE] Fed. Rep. of Germany ....... 3405523

[51] Int. Cl.$^4$ ............................................. B05D 3/02
[52] U.S. Cl. ............................. 427/389.9; 427/385.5; 427/389.7; 427/389.8
[58] Field of Search ............... 427/389.9, 389.8, 389.7, 427/385.5

[56] References Cited

U.S. PATENT DOCUMENTS

| | | | |
|---|---|---|---|
| 3,634,355 | 1/1972 | Barr et al. | 260/49 |
| 3,785,916 | 1/1974 | Turton et al. | 156/166 X |
| 4,489,129 | 12/1984 | Shue et al. | 427/389.8 X |

FOREIGN PATENT DOCUMENTS 056703 12/1982 European Pat. Off. .

*Primary Examiner*—Thurman K. Page
*Attorney, Agent, or Firm*—Keil & Weinkauf

[57] ABSTRACT

Fiber-reinforced materials are produced by impregnating continuous filaments with a melt of a polyarylene sulfide ketone, preferably one having a reduced viscosity $\eta_{red}$ of from 0.1 to 0.5 [dl.g$^{-1}$], shaping the resulting semi-finished product to give a finished article and heating the latter for not less than 15 minutes at above the crystallite melting point of the polyarylene sulfide ketone, the latter undergoing crosslinking and its glass transition temperature Tg increasing by not less than 5° C.

3 Claims, No Drawings

PRODUCTION OF FIBER-REINFORCED MATERIALS

Polyarylene sulfide ketones are known, those having the structure

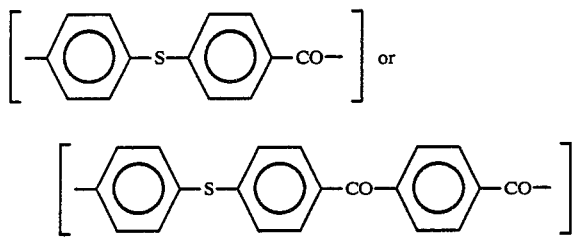

being preferred.

They are preferably prepared by reacting an aromatic dihalo compound, in which each halogen atom is activated by a keto group in the para position, with an essentially equivalent amount of an alkali metal sulfide in a polar solvent. The principle of this reaction is described in, for example, U.S. Pat. No. 3,634,355.

Particularly preferred aromatic dihalo compounds are 4,4'-difluorobenzophenone, 4,4'-dichlorobenzophenone, 1,4-bis-(4-fluorobenzoyl)-benzene and 1,4-bis-(4-chlorobenzoyl)-benzene. 4-Chloro-4'-fluorobenzophenone, 1-(4-chlorobenzoyl)-4-(4-fluorobenzoyl)-benzene, 1,3-bis-(4-chlorobenzoyl)-benzene, 1,5-bis-(4-chlorobenzoyl)-naphthalene, 1-(4-chlorobenzoyl)-diphenyl oxide, 4,4'-bis-(4-chlorobenzoyl)-biphenyl and 2,5-bis-(4-chlorobenzoyl)-thiophene are also very useful.

As much as 5, preferably from 0.2 to 2, mol % of the dihalo compounds can be replaced with hexafluorobenzene, hexachlorobenzene or pentachloropyridine. These compounds are added before or during the polycondensation, and permit controlled crosslinking of the polymer and therefore allow the viscosity to be increased in a selective manner.

Preferred alkali metal sulfides are sodium sulfide and potassium sulfide, and these are generally used in the form of their hydrates. If desired, they can be used together with alkali metal hydroxides, alkali metal sulfites or alkali metal bisulfites. The alkali metal sulfide is employed in about a stoichiometric amount, preferably in an amount of from 0.85 to 1.15 mol %, based on the dihalo compound.

Suitable polar solvents are high boiling sulfoxides, sulfones, nitriles, ethers, ketones and alcohols, N-alkyllactams which additionally carry an alkyl radical of 1 to 6 carbon atoms on the nitrogen atom, in particular N-methylpyrrolidone, being preferred.

The amount of solvent is preferably from 2 to 15 moles per mole of alkali metal sulfide.

As a rule, the condensation is carried out at from 160° C. to 300° C., preferably from 200° to 280° C. The reaction time can be as long as 10 hours, but is preferably from 0.2 to 5 hours. It is advantageous if the reaction temperature is increased stepwise during this time. Since the reaction temperature is generally higher than the boiling point of the solvent mixture, the process is preferably carried out under superatmospheric pressure.

When the reaction mixture has been cooled to about 150° C. and the pressure then compensated, the polycondensation can be terminated by passing in methyl chloride. The reaction time required for this purpose is from 0.1 to 2, preferably from 0.2 to 0.5, hour.

The present invention relates to a process for the production of fiber-reinforced materials by impregnating continuous filaments or fibrous structures with a melt of a polyarylene sulfide ketone and shaping the resulting semi-finished product.

It is known that fiber-reinforced materials based on highly heat-resistant thermoplastics can be produced by impregnation of the fibers with a solution of the thermoplastic, removal of the solvent and thermoplastic shaping of the resulting semi-finished product to give a finished article. A process of this type is described in, for example, U.S. Pat. No. 3,785,916, where carbon fibers are impregnated with, preferably, polyethersulfone solutions. Impregnation with a thermoplastic melt is also suggested there; in the case of the polysulfide ketone

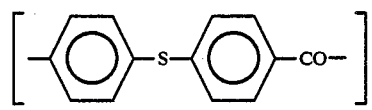

also mentioned, it is in fact impossible to carry out impregnation with a solution since the polysulfide ketone is insoluble. However, if an attempt is made to impregnate fibrous structures with a melt of a polyarylene sulfide ketone of the usual viscosity, it is found that too little wetting takes place.

EP-A No. 56 703 proposes impregnating fibrous structures with melts of low molecular weight thermoplastic polymers of low viscosity. However, the resulting fiber-reinforced materials possess unsatisfactory toughness and expansion characteristics particularly in the case of partially crystalline thermoplastics. Although the possibility of subsequently increasing the molecular weight of the thermoplastic polymer is suggested in EP-A No. 56 703, the methods recommended (solid-phase condensation, addition of crosslinking agents and exposure to radiation) lead to uncontrollable and undesirable side reactions and hence to a deterioration in the mechanical properties of the finished articles, or require very expensive apparatus. It is an object of the present invention to produce fiber-reinforced materials which are based on polyarylene sulfide ketones and are very tough and possess good heat distortion resistance and resistance to solvents.

We have found that this object is achieved if continuous filaments or fibrous structures are impregnated with a melt of a polyarylene sulfide ketone, the resulting semi-finished product is shaped to give a finished article, and the latter is heated for not less than 15 minutes at above the crystallite melting point of the polyarylene sulfide ketone, the latter undergoing crosslinking.

Because of the special structure (sulfur bridge) of the polyarylene sulfide ketone, this crosslinking is possible without the addition of chemical crosslinking agents. As a result of the crosslinking, the toughness of the finished articles is increased and the solvent resistance is improved.

Polyarylene sulfide ketones are partially crystalline thermoplastics. Their crystallite melting point is from 340° to 420° C., and the glass transition temperature Tg is from 140° to 180° C. in the non-crosslinked state. By means of the crosslinking according to the invention, this is increased by not less than 5° C., preferably more than 10° C., in particular more than 20° C.

The impregnation of the continuous filaments is preferably carried out with a low-viscosity melt of a low molecular weight polyarylene sulfide ketone whose reduced viscosity $\eta_{red}$ is 0.1–0.5 [dl.g$^{-1}$]. The reduced viscosity is measured at 25° C. in 98% strength sulfuric acid, and calculated using the formula $\eta_{red}=\theta_{spec}/c$. The polymer concentration c is 0.5 g/100 cm$^3$ of solution. Such low molecular weight polyarylene sulfides can be prepared by using a small excess of a dihalo compound or alkali metal sulfide.

Suitable reinforcing fibers are those consisting of glass, carbon or aromatic polyamides. They can be drawn through an impregnating bath in the form of individual strands (rovings), of bands consisting of several rovings lying next to one another, or of fabrics. The rovings should be well spread out, ie. pulled apart to give a sheet-like structure, a procedure which can be effected with conventional apparatuses. The temperature of the polymer melt is preferably below 420° C., and from 350° to 380° C. in the case of the polysulfide ketone

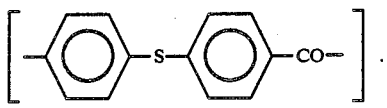

The residence time should be about 1–10 min. If the melting point is too high or the residence time too long, undesirable premature crosslinking may take place.

The fiber content of the fiber-reinforced material should be from 30 to 85, preferably from 45 to 70, vol. %, and can be influenced by the residence time in the impregnating bath and by downstream heated calenders in which excess melt is pressed out. The impregnated fibers can then be cooled and wound on bobbins, the said fibers then being non-tacky. They constitute a semi-finished product which has a long shelf life and can be further processed by a thermoplastic method. They can be wound on spindles or shafts, if necessary directly after impregnation, without cooling, and can be laid there at above the melting point of the polyarylene sulfide ketone, and shaped into tubes in the thermoplastic state. Sheet-like semi-finished products can be produced if impregnated roving bands, preferably from 2 to 150 cm wide, are cooled and then cut into sheet-like pieces or wound continuously onto bobbins. These unidirectional fiber-reinforced prepregs, which are preferably from 0.1 to 0.5 mm thick, can be stacked one on top of the other in layers, and the individual prepregs can be laid with any desired angle between each other. The stacks can then be shaped to finished articles by pressing at above the melting point of the polyarylene sulfide ketone. Impregnated fabrics can be further processed in a similar manner.

In principle, it is also possible to apply polyarylene sulfide ketones in powder form or as an aqueous dispersion onto the fibers, or to lay films or fibers of the polymers between layers of reinforcing fibers. Melting of the polymer is carried out subsequently, preferably in a press, the fiber-reinforced material being shaped at the same time. In this case, it is also possible to use high molecular weight polyarylene sulfide ketones which have a reduced viscosity $\eta_{red}$ of from 0.4 to 0.8 [dl.g$^{-1}$]. The residence time in the press (in the absence of air) is above 0.5–2 hours in this case.

It is essential that the fiber-reinforced material, in the form of the finished article, is heated after the shaping process for not less than 15 minutes at above the crystallite melting point of the polyarylene sulfide ketone, this heating procedure preferably lasting for from 30 minutes to 12 h when carried out in the presence of air, and for from 2 to 12 h when carried out under an inert gas.

The fiber-reinforced materials produced according to the invention can be used in particular in the aviation and space flight sectors.

EXAMPLE 1

Poly-p-phenylene sulfide ketone (PSK) obtained from 4,4'-difluorobenzophenone 129 g of sodium sulfide trihydrate (1.0 mole of Na$_2$S), 800 ml of N-methyl-2-pyrrolidone and finely milled sodium hydroxide (for neutralizing of any sodium hydrogen sulfide present) are initially taken in an autoclave equipped with a distillation head and a stirrer, and are slowly heated to 210° C.

When about 40 ml of distillate have been obtained, the major part of which consists of water, the reaction mixture is allowed to cool to 40°–50° C. 218.2 g (1 mole) of 4,4'-difluorobenzophenone and 2.1 g (3.3 mol %) of sodium sulfite (to destroy any disulfides formed) are then introduced while stirring vigorously. The reaction vessel is flushed with nitrogen, N$_2$ is forced in at a pressure of 5 bar, and the reaction mixture is then heated to 250° C. and left at this temperature for 4 hours. When the reaction is complete, the autoclave is cooled to 100° C., the pressure is let down and the reaction mixture is removed.

The resulting PSK is separated off and carefully washed with hot water and hot acetone until the ash content is less than 0.5%. Thorough drying gives a beige solid having a solution viscosity $\eta_{red}$ of 0.78 [dl/g], a glass transition temperature Tg of 170° C. and a crystallite melting point Tm of 367° C.

EXAMPLE 2

Poly-p-phenylene sulfide ketone ketone (PSKK) obtained from 1,4-bis-(4-fluorobenzoyl)-benzene 129 g of sodium sulfide trihydrate (1 mole of Na$_2$S), 800 ml of N-methyl-2-pyrrolidone, 150 ml of toluene and finely milled sodium hydroxide (for neutralizing any sodium hydrogen sulfide present) are initially taken in an autoclave equipped with a distillation head, a water separator and a stirrer, and are heated to 160° C.

The stoichiometric amount of liberated water of crystallization (not more than 2 moles) is separated off in the course of 90 min, and the toluene is completely distilled off. The mixture is allowed to cool to 40°–50° C., after which 322.3 g (1 mole) of 1,4-bis-(4-fluorobenzoyl)-benzene and 2.1 g (3.3 mol %) of sodium sulfite (to eliminate any disulfides formed) are added while stirring vigorously. The reaction vessel is flushed with nitrogen, and the reaction is carried out for 4 hours at 250° C. under an N$_2$ prepressure of 5 bar (the pressure increases to 10 bar). When the reaction is complete, the autoclave is cooled to about 100° C., the pressure is let down and the reaction mixture is removed.

The resulting product is separated off, washed carefully with hot water and hot acetone (ash content <0.5%) and dried.

The gray crystalline solid has a crystallite melting point of 406° C. and a glass transition temperature of 169° C., and its solution viscosity $\eta_{red}$ is determined as 0.68 [dl/g].

EXAMPLE 3

PSKK prepared as described in Example 2 is applied, in the form of a powder, onto a glass fabric from Interglas. 15 layers of fabric containing 45 vol. % of thermoplastics are draped one on top of the other and pressed for 1 hour with a platen press at 410° C. and under 150 bar. During this procedure, the fabric is impregnated with the polyarylene sulfide ketone, and shaped into a 2 mm thick sheet. Heating is then continued for 2 hours in the air at 410° C., the glass transition temperature of the PSKK increasing by 50° C. to 225° C. The finished article is not attacked even by concentrated sulfuric acid.

In the tensile test (according to Aviation Standard 29 971), parallel to the fiber direction, the modulus of elasticity is found to be about 19,000 N.mm$^{-2}$ and the tensile strength about 300 N.mm$^{-2}$. These mechanical properties remain virtually constant over a wide temperature range.

EXAMPLE 4

100 carbon fiber rovings (from Toray), each containing 6,000 filaments, are drawn parallel through a bath containing a melt of PSK (prepared as described in Example 1) at 380° C. The residence time in the bath is 5 min. The impregnated roving band then passes through a heated pair of gaging rolls, after which it is cooled and cut into sheet-like pieces (prepregs). These semi-finished products have a long shelf life.

Eight such prepregs are draped one on top of the other with the fibers running in the same direction, and are pressed to give a 2 mm thick sheet. This is done using a platen press which is heated at 200° C.; the laid web is heated beforehand externally to 400° C., introduced into the said press and pressed at from 100 to 150 bar. The fiber content is 55 vol.%. The finished article is then heated for 2 hours at 420° C., the glass transition temperature Tg increasing by 50° C. to 220° C.

The mechanical test parallel to the fiber direction gives a tensile strength of 1950 N.mm$^{-2}$ and a tensile modulus of elasticity of 120,000 N.mm$^{-2}$.

EXAMPLE 5

A glass fiber roving from Gewetex (EC 14, 1200 tex) is drawn through a PSK impregnating bath as described in Example 4. The resulting prepreg roving, which has a fiber content of 65 vol.%, is cooled and then wound continuously onto a bobbin.

This semi-finished product is unwound once again, preheated to 350° C. and laid on a mandrel having a diameter of 70 mm and heated at 415° C., in 8 layers according to the following pattern: 90°/90°/−45°/+45°/+45°/−45°/90°/90°. The resulting tube is heated for 1 hour at 420° C., the glass transition temperature of the PSK increasing by 50° C. to 220° C. The finished article is capable of bearing high torsional loads even at elevated temperatures.

We claim:

1. A process for the production of fiber-reinforced materials comprising the following steps in sequence:
   (a) impregnating continuous filaments or fibrous structures with a low-viscosity melt of a low-molecular weight polyarylene sulfide ketone characterized by repeating units of the formula

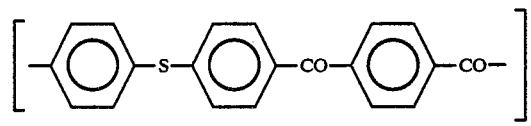

(b) shaping the resulting semi-finished product to give a finished article, and then
   (c) heating the finished article for a period of not less than 15 minutes at a temperature above the crystallite melting point of the polyarylene sulfide ketone to effect a crosslinking thereof.

2. A process as claimed in claim 1, wherein the reduced viscosity $\eta_{red}$ of the polyarylene sulfide ketone used for the impregnation is from 0.1 to 0.5 [dl.g$^{-1}$].

3. A process as claimed in claim 1, wherein the glass transition temperature Tg of the polyarylene sulfide ketone is increased by not less than 5° C., preferably by not less than 10° C., as a result of the crosslinking.

* * * * *